July 1, 1958   E. S. V. LAUB   2,841,138
ALLERGY TESTING DEVICE
Filed March 11, 1957
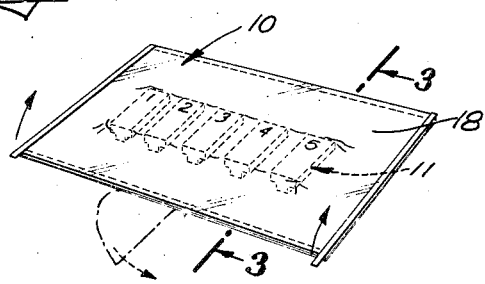
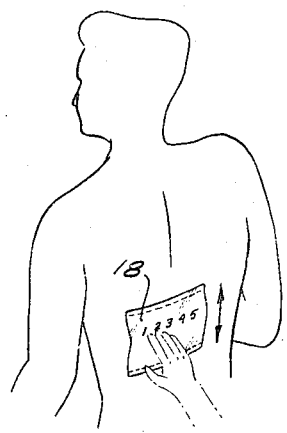
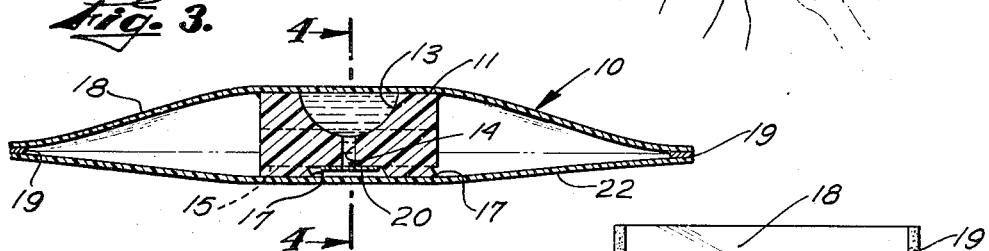
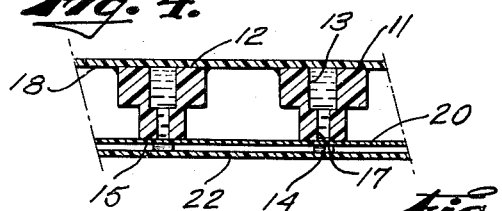
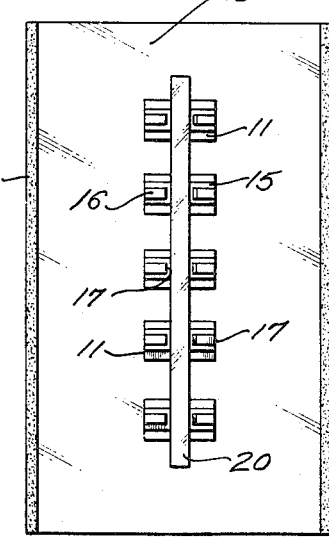
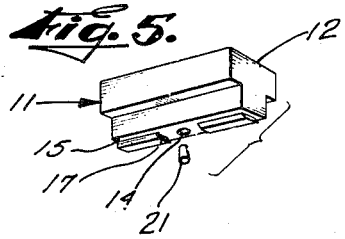
ERNEST S. V. LAUB
INVENTOR.
BY
AGENT

United States Patent Office 2,841,138
Patented July 1, 1958

2,841,138

ALLERGY TESTING DEVICE

Ernest S. V. Laub, Corona del Mar, Calif.

Application March 11, 1957, Serial No. 645,227

4 Claims. (Cl. 128—2)

This invention relates to a device for testing human beings for allergies, by the application of allergens to the skin.

Under presently recognized procedures for testing individuals for sensitivity to various foods, pollens, house dusts, and other substances which may cause an allergic condition, there are tests of three different types: the patch test (seldom used for this purpose), the dermal scratch test, and the endermal or intradermal test. This invention pertains to the second type, the dermal scratch test.

The intradermal test is considered by most allergists to be the most sensitive and also perhaps less likely to involve contamination between different allergens when a number of allergens are applied. However it is time-consuming and expensive, and many patients can not afford it and forego treatment altogether rather than become involved in the necessary expense. It is also rather terrifying to small children and to many adults, as it requires repeated applications of a needle.

It is an object of my invention to provide an allergy testing device which will permit the simultaneous testing of a number of allergenic substances by the dermal scratch method.

Another object of my invention is to provide an allergy testing device having a plurality of allergen-carrying units for applying a number of allergenic substances by the dermal scratch method, each of the units being used simultaneously with the others or being held temporarily inoperative, at the will of the allergist.

A further object of my invention is to provide a testing device for the dermal scratch method of allergy testing, in which the danger of contamination between different units carrying different allergens is reduced to a minimum.

It is still a further object of my invention to provide a multiple allergy testing device of low cost, which may be economically discarded after use if desired.

In the accompanying drawing illustrative of a presently preferred embodiment of my invention:

Fig. 1 is a perspective view from above of an envelope containing a multiple testing device according to the principles of my invention;

Fig. 2 is a view on a reduced scale showing how the device is applied to the skin;

Fig. 3 is a transverse sectional view on the line 3—3 of Fig. 1, and on an enlarged scale;

Fig. 4 is a fragmentary longitudinal sectional view on the line 4—4 of Fig. 3;

Fig. 5 is a perspective view from below of an individual allergen-holding block or unit; and Fig. 6 is a bottom plan view on a slightly reduced scale of the multiple device, with the lower part of the envelope removed and the device ready for application.

Having reference now to the details of the drawing, I have shown in Fig. 1 an envelope 10 containing a plurality of blocks or units 11, each capable of holding a small quantity of an ellergenic substance and also capable of scarifying the skin. For convenience, the blocks 11 may be numbered for identification as shown, and the envelope 10 may be made of a transparent material to permit the identification to be read.

As shown in Figs. 3, 4, and 5, the individual blocks 11 comprise a unit having a flat upper side 12 within which is sunk a well 13 for holding an allergenic substance. At the bottom of the well 13 is a reduced bore 14 which communicates between the well 13 and the bottom side 15 of the block 11. The bottom 15 may be narrower than the upper side 12; it is not desirable to have a wide skin-depressing surface at this point. Upon the bottom 15 are scarifying projections 16 with sharpened corners 17, capable of scratching the skin when drawn across it. The projections 16 may be further reduced in width with respect to the reduced size of the bottom 15.

At least the upper layer 18 of the envelope 10—that is, the layer of the envelope in contact with the upper side 12 of the blocks 11—is made of elastic, as well as transparent, material. A number of sheet plastic materials are now available having both of these qualities. The blocks 11 are cemented to the layer 18 around all four margins of the side 12 as shown at 19, so that the contents of the wells 13 are sealed in, but nevertheless with an elastic cover capable of being depressed into the well.

The blocks 11 are furthermore arranged on the layer 18 with their bores 14 in alignment, so that the bores 14 may be collectively sealed by a sealing strip 20. In order that the strip 20 may not interfere with, or be interfered with by, the scarifying projections 16, the alignment of the projections 16 should be excluded from the alignment of the bores 14. As there will be times when it is desired to test a patient for the contents of some of the blocks and not of the others—say, the contents of the blocks identified as 1, 3, and 5, but not the blocks identified as 2 and 4—and the strip 20 can not be used to seal the blocks 2 and 4 without also sealing block 3 between them, small plugs 21 are provided which may be used to seal the bores 14 in any of the blocks the contents of which are not to be tested. The lower layer 22 of the envelope 10 is for the purpose of preserving sterility of the scarifying corners 17 until the time of use.

In the use of my improved testing device, the wells 13 having been previously filled with allergenic substances and the blocks 11 being contained in the envelope 10, the lower layer 22 of the envelope 10 is removed, exposing the scarifying corners 17 of the blocks 11. The blocks 11 are then picked up by the upper layer 18 of the envelope and are applied to the patient's skin, on the back or arm or leg as may be convenient. The allergist may hold an edge of the layer 18 between thumb and fingers, as shown in Fig. 2. The group of blocks is then moved in the longitudinal direction of the individual blocks—that is, up and down as seen in Fig. 2, or left and right as seen in Fig. 6—to cause the corners 17 to scratch the skin. With the half-envelope held in place and one edge of it lifted, the tape strip 20 is then removed, the fingers are shifted to exert pressure on the elastic layer 18 above the wells 13, and the contents of the wells are exuded through the bores 14 into the skin scratches. The remaining half-envelope and the attached blocks may then be thrown away.

The disclosed embodiment is not to be construed as a limitation upon the invention, the scope of which is deemed to include any desirable constructive modification within the spirit and breadth of the appended claims.

I claim:

1. In a device for testing for allergies, a plurality of blocks for holding allergens, each block having a central cavity extending between opposed sides of said block, said cavity having a well at one of said sides for holding an allergenic substance and having a reduced bore communicating between said well and the other of said sides for discharging said substance; scarifying means on said other side, the opening of said bore at said other side being recessed with respect to said scarifying means; an envelope containing said blocks with said bores in an alignment from which said scarifying means are excluded, one side of said envelope sealing said wells and the other side of said envelope being opposed to said scarifying means and said bores and being removable to expose said scarifying means; and a sealing strip common to said aligned bores for sealing said bores, said strip being removable as a whole or in part to expose selected numbers of said bores.

2. In a device for testing for allergies, a plurality of blocks for holding allergens, each block having a central cavity extending between opposed sides of said block, said cavity having a well at one of said sides for holding an allergenic substance and having a reduced bore communicating between said well and the other of said sides for discharging said substance; scarifying means on said other side, the opening of said bore at said other side being recessed with respect to said scarifying means; an envelope containing said blocks with said bores in an alignment from which said scarifying means are excluded, one side of said envelope sealing said wells and the other side of said envelope being opposed to said scarifying means and said bores and being removable to expose said scarifying means; and sealing means, distinct from such envelope, for sealing said bores.

3. A device for testing for allergies as set forth in claim 2, in which said sealing means comprise individual seals for said bores.

4. A device for testing for allergies as set forth in claim 2, in which said one side of said envelope is of elastic material capable of being depressed into said wells.

No references cited.